United States Patent [19]
Hays et al.

[11] Patent Number: 5,133,941
[45] Date of Patent: Jul. 28, 1992

[54] APPARATUS FOR HYDROGENATING HYDROCARBONS

[75] Inventors: George E. Hays, Bartlesville, Okla.; Theodore M. Classen, Liberty, Mo.

[73] Assignee: Phillips Petroleum Company, Bartlesville, Okla.

[21] Appl. No.: 646,251

[22] Filed: Jan. 28, 1991

Related U.S. Application Data

[62] Division of Ser. No. 234,316, Aug. 19, 1988, Pat. No. 4,995,961.

[51] Int. Cl.$^5$ .................. B01J 8/20; F27B 15/14; F27B 15/16; F27B 15/18
[52] U.S. Cl. .................. 422/140; 261/21; 261/147; 261/163; 422/106; 422/110; 422/141; 422/142; 422/189; 422/197; 422/202; 422/231
[58] Field of Search ............ 34/57 A; 422/141, 142, 422/140, 198, 202, 200, 201, 188, 189, 197, 231, 106, 110; 261/21, 153, 147

[56] References Cited

U.S. PATENT DOCUMENTS

| | | | |
|---|---|---|---|
| 1,404,709 | 1/1922 | Allbright | 422/202 |
| 1,949,109 | 2/1934 | Pier et al. | 196/53 |
| 2,134,571 | 10/1938 | Morlock | 87/12 |
| 2,419,245 | 4/1947 | Arveson | 34/57 A |
| 2,797,908 | 7/1957 | Zubrzycki | 34/57 A |
| 2,819,890 | 1/1958 | Rosa et al. | 34/57 A |
| 2,899,330 | 8/1959 | Lanning | 208/108 |
| 2,913,388 | 11/1959 | Howell et al. | 208/8 |
| 2,931,767 | 4/1960 | Wilson | 208/63 |
| 2,994,724 | 8/1961 | Hillard, Jr. et al. | 260/666 |
| 3,355,376 | 11/1967 | Gorin et al. | 208/10 |
| 3,681,200 | 8/1972 | Ridgway, Jr. | 195/142 |
| 3,847,748 | 11/1974 | Gibson et al. | 195/109 |
| 3,902,856 | 9/1975 | Burroughs et al. | 422/142 X |
| 4,008,128 | 2/1977 | Dorner | 196/110 |
| 4,134,825 | 1/1979 | Bearden, Jr. et al. | 208/108 |
| 4,411,768 | 10/1983 | Unger et al. | 208/59 |
| 4,464,247 | 8/1984 | Thacker | 422/142 X |
| 4,478,707 | 10/1984 | Bischoff et al. | 208/157 |
| 4,925,632 | 5/1990 | Thacker et al. | 422/140 |

Primary Examiner—Robert J. Warden
Assistant Examiner—Amaha Santiago
Attorney, Agent, or Firm—Laney, Dougherty, Hessin & Beavers

[57] ABSTRACT

An improved process and apparatus for hydrogenating a stream of hydrocarbons is provided. The pressure and temperature of the stream are elevated and the stream is passed through two or more serially connected hydrogenation reaction zones. While passing through the reaction zones hydrogen is dispersed in the stream and the stream is caused to flow along successive downward and upward paths. The reacted stream is cooled prior to reducing the pressure exerted thereon.

12 Claims, 2 Drawing Sheets

APPARATUS FOR HYDROGENATING HYDROCARBONS

This is a divisional of copending application(s) Ser. No. 07/234,316 filed on Aug. 19, 1988, now U.S. Pat. No. 4,995,961 issued Feb. 26, 1991.

BACKGROUND OF THE INVENTION

1. Field of the Invention

This invention relates to hydrogenation, and more particularly, to the hydrogenation of hydrocarbons to produce an upgraded product stream.

2. Description of the Prior Art

The upgrading of hydrocarbons by hydrogenation at elevated temperatures and pressures is well known. In general, the hydrogenation process is carried out at a pressure in the range of from about 500 psig to about 3000 psig and a temperature in the range of from about 700° F. to about 900° F. A wide variety of well known hydrogenation catalysts have been employed.

Heretofore, it has often been difficult to disperse and maintain hydrogen in hydrocarbons reacted therewith, particularly high boiling viscous hydrocarbons. Also, because of the high reaction temperatures and pressures involved in the hydrogenation process, special valving and other control apparatus have been required which have made apparatus for carrying out the process expensive and elaborate. By the present invention, an improved process and apparatus for hydrogenating hydrocarbons are provided which overcome the problems mentioned above.

SUMMARY OF THE INVENTION

A process and apparatus for hydrogenating a continuous stream of hydrocarbons at elevated pressure and temperature are provided. In accordance with the process, hydrogen is dispersed in the stream of hydrocarbons as it is passed through two or more serially connected hydrogenation reaction zones wherein the stream is caused to flow along successive downward and upward paths. Hydrogenation catalyst can be combined with the stream of hydrocarbons prior to passing the hydrocarbons through the reaction zones.

Hydrogen is preferably dispersed in the stream of hydrocarbons by co-current sparging at a plurality of locations along the successive downward and upward paths followed by the hydrocarbon stream. Excess hydrogen and light hydrocarbon gases produced are withdrawn after each upward path. The withdrawn gases can be mixed with additional hydrogen and reintroduced into the hydrocarbon stream if desired. The combination of hydrogen sparging and the downward and upward flow paths followed by the hydrocarbon stream is particularly effective in producing and maintaining dispersions of hydrogen and catalyst in the hydrocarbon stream as the hydrogenation reaction is carried out.

The reacted hydrocarbon stream and other process streams are cooled prior to pressure reduction or pumping. This prevents the high reaction temperatures which exist within the reactor from reaching the valves, pumps and other similar apparatus utilized whereby such apparatus can be of conventional low temperature design.

Other features and advantages of the invention will be readily apparent to those skilled in the art upon a reading of the description of preferred embodiments which follows when taken in conjunction with the accompanying drawings.

DESCRIPTION OF THE PREFERRED EMBODIMENT

In accordance with the process of the present invention, a stream of hydrocarbons is reacted with hydrogen to form a desired product stream. For example, heavy hydrocarbons, i.e., high boiling viscous hydrocarbons such as a petroleum residual product or solvent refined coal can be hydrogenated to form an upgraded mixture, e.g., a mixture of less viscous lower boiling materials. A hydrogenation catalyst can be combined with the stream of hydrocarbons before or after the pressure and temperature of the stream are elevated. Hydrogen is dispersed in the hydrocarbon stream as the stream is passed through two or more serially connected hydrogenation zones. While flowing through the hydrogenation zones, the stream of hydrocarbons containing hydrogen and catalyst, if used, is caused to flow along successive downward and upward paths whereby a dispersion of the hydrogen and catalyst is promoted and substantially maintained in the hydrocarbon stream while the hydrogenation reaction is carried out. The reacted stream is cooled prior to pressure reduction.

As mentioned above, any of a wide variety of well known catalysts for hydrogenating hydrocarbon materials can be utilized. A preferred such catalyst is molybdenum hexacarbonyl. The catalyst can be dispersed in particulate form in the stream of hydrocarbons in any convenient manner utilizing conventional equipment prior to flowing the stream through the hydrogenation reaction zones.

The pressure of the stream of hydrocarbons is elevated to a level in the range of from about 500 psig to about 3000 psig followed by heating of the stream to a temperature in the range of from about 700° F. to about 900° F. The particular pressure and temperature utilized within the above ranges depend upon the composition of the hydrocarbon stream and other factors well known to those skilled in the art.

Hydrogen is dispersed in the stream of hydrocarbons at a rate resulting in a ration of hydrogen to hydrocarbons of from about 300 to about 2000 standard cubic feet of hydrogen per barrel of hydrocarbons. The particular ratio of hydrogen to hydrocarbons used within the above range depends on the composition of the hydrocarbon stream and the purpose of the hydrogenation, e.g., a low ratio is used for upgrading gravity with a higher ratio being used for hydrocracking, hydrodesulfurization or hydrodenitrogenation. The introduction of the hydrogen into the stream of hydrocarbons is preferably carried out by the co-current sparging of the hydrogen into the hydrocarbons whereby great quantities of small hydrogen bubbles are formed and dispersed in the hydrocarbons. The downward and upward paths along which the stream of hydrocarbons containing the hydrogen bubbles is caused to flow promotes and contributes to the maintenance of the dispersion of hydrogen bubbles as well as catalyst in the hydrocarbon stream.

Figure 1:
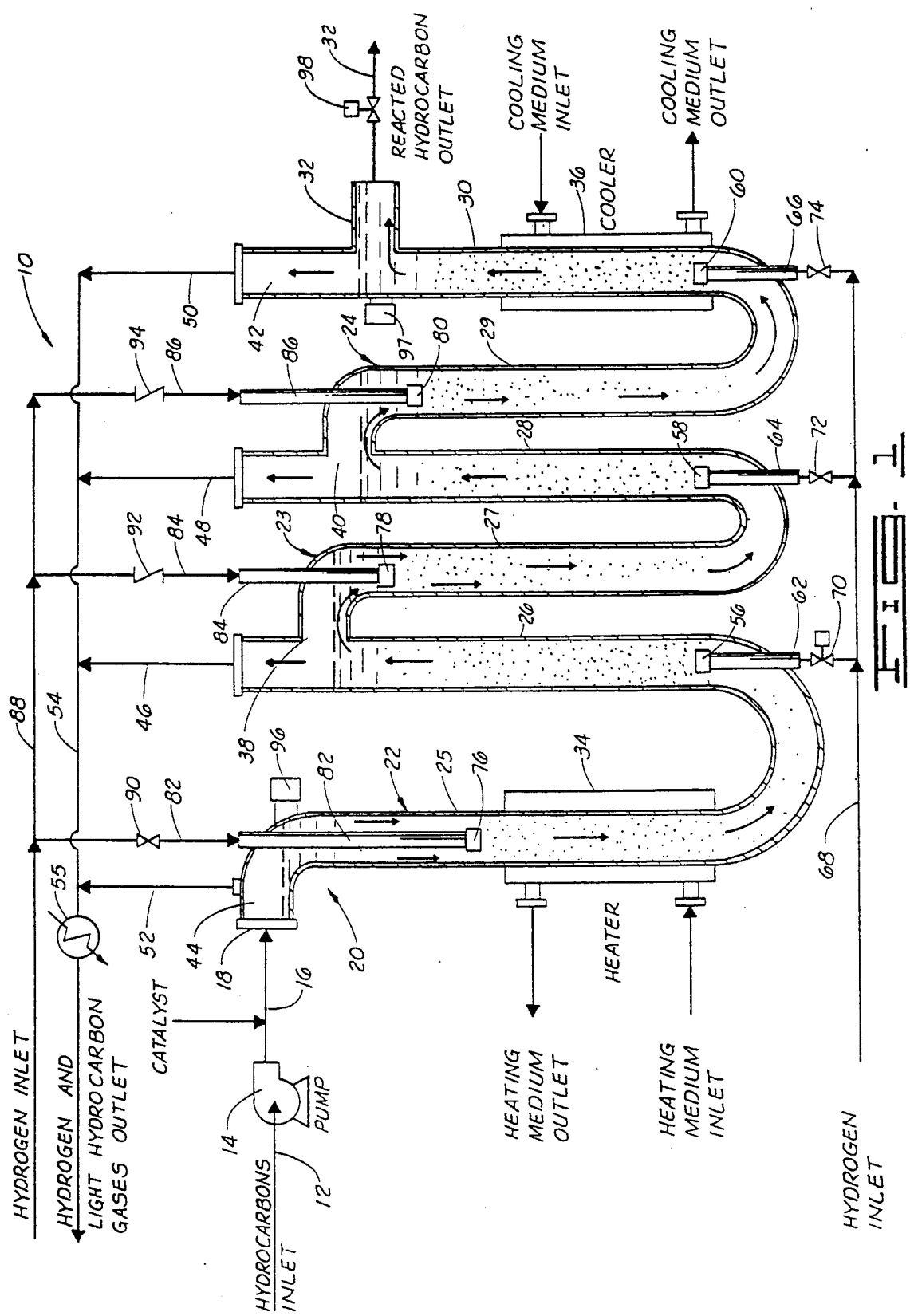
FIG. 1 is a schematic view of one form of apparatus of the present invention.

Referring now to the drawings, and particularly to FIG. 1, one form of apparatus for carrying out the hydrogenation process is illustrated and generally designated by the numeral 10. A stream of hydrocarbon materials is conducted to the apparatus 10 by a conduit 12. The conduit 12 is connected to a pump 14 which pumps a continuous stream of hydrocarbons through the apparatus 10 and elevates the pressure within the apparatus 10. The discharge of the pump 14 is connected by a conduit 16 to the inlet 18 of a reactor 20. Catalyst can be introduced into the conduit 16 and into the stream of hydrocarbons flowing therethrough using conventional apparatus (not shown).

The reactor 20 is comprised of two or more, preferably three to five, U-shaped tubular conduits which are connected in series. Each of the U-shaped tubular conduits includes a pair of legs, preferably positioned vertically, which form hydrogenation reaction zones.

More specifically, the reactor 20 is comprised of three serially connected U-shaped conduits 22, 23 and 24. The top end portion of the first or downflow leg 25 of the U-shaped conduit 22 is connected to the inlet 18. The top end portion of the second or upflow leg 26 of the U-shaped conduit 22 is connected to the top end portion of the downflow leg 27 of the U-shaped conduit 23. In a like manner, the top end portion of the upflow leg 28 of the U-shaped conduit 23 is connected to the top end portion of the downflow leg 29 of the U-shaped conduit 24. The top end portion of the upflow leg 30 of the U-shaped conduit 24 includes a liquid outlet conduit 32 connected thereto.

A heat exchanger 34 is connected to the downflow leg 25 of the U-shaped conduit 22 for heating the stream of hydrocarbons as it flows therethrough. A heating medium is circulated through the heat exchanger 34 whereby heat is transferred from the heating medium to the hydrocarbon stream in a conventional manner.

A second heat exchanger 36 is connected to the upflow leg 30 of the U-shaped conduit 24 for cooling the reacted hydrocarbon stream flowing therethrough prior to reducing the pressure thereon. A cooling medium is circulated through the heat exchanger 36 whereby heat is transferred from the hydrocarbon stream to the cooling medium.

Figure 2:
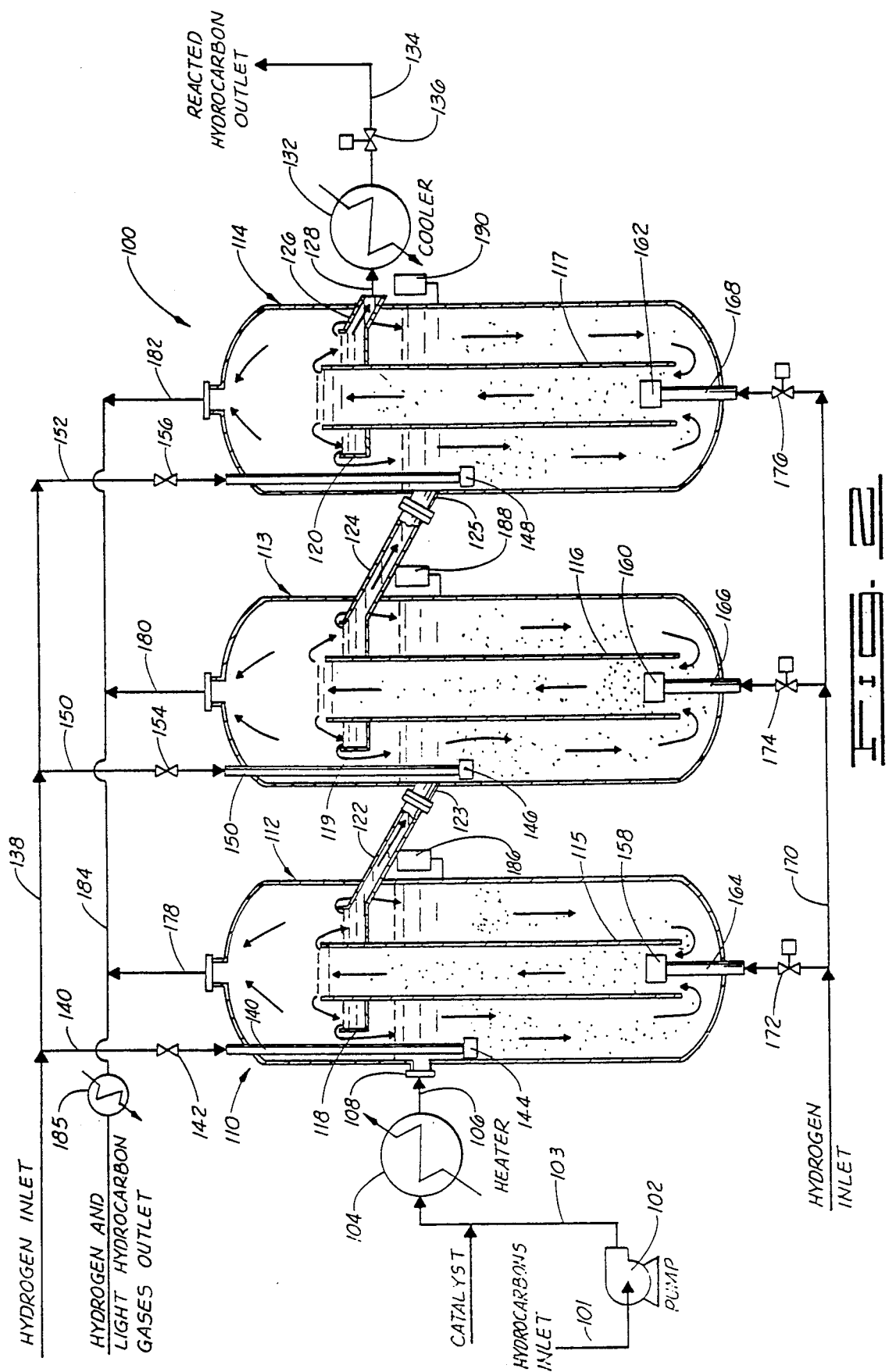
FIG. 2 is a schematic view of an alternate form of apparatus of the present invention.

As will be understood by those skilled in the art, the heat exchangers 34 and 36 can be of a variety of types and designs, and can be attached to and a part of the reactor 20 as shown in FIG. 1 or the heat exchangers can be separately positioned immediately upstream and downstream of the reactor as shown in FIG. 2.

The connection between the top end portion of the upflow leg 26 of the U-shaped conduit 22 and the downflow leg 27 of the U-shaped conduit 23 as well as the connection between the top end portion of the upflow leg 28 of the U-shaped conduit 23 and the downflow leg 29 of the U-shaped conduit 24 are positioned to form level controlling liquid spillover weirs whereby the levels of liquid hydrocarbons in the upflow legs 26 and 28 are maintained in the vicinity of the connections. That is, the top end portion of the downflow leg 27 includes a bend and is connected to the side of the upflow leg 26 a short distance below the the top end of the upflow leg 26. The liquid hydrocarbon level in the leg 26 is maintained at the level of the connection which provides a gas accumulation space 38 in the top ends of the legs 26 and 27. In a like manner, the top end portion of the downflow leg 29 includes a bend and is connected to the side of the upflow leg 28 to provide a gas accumulation space 40 in the top ends of the legs 28 and 29. Also, the liquid outlet conduit 32 which is connected to the side of the upflow leg 30 of the U-shaped conduit 24 provides a gas accumulation space 42 at the top end of the leg 30. The top end portion of the downflow leg 25 of the U-shaped conduit 22 also includes a gas accumulation space 44 therein as a result of the level of liquid hydrocarbons in the leg 25 being controlled as will be described further below.

In order to equalize the pressures within the gas accumulation spaces 38, 40, 42 and 44 and to withdraw excess hydrogen and light hydrocarbon gases therefrom, the gas accumulation spaces are connected by conduits 46, 48, 50 and 52, respectively, to an outlet header 54. The outlet header 54 leads the excess hydrogen and light hydrocarbon gases to a point of further processing or use. A cooling heat exchanger 55 is disposed in the header 54.

Hydrogen is introduced into the reactor 20 and into the stream of hydrocarbons by way of a plurality of spargers which cause the hydrogen to be dispersed in the hydrocarbons in small bubble form. Specifically, hydrogen spargers 56, 58 and 60 disposed within the bottom end portions of the upflow legs 26, 28 and 30 are connected to conduits 62, 64 and 66, respectively. The conduits 62, 64 and 66 sealingly pass through walls of the U-shaped conduits 22, 23 and 24 and are connected to a hydrogen inlet header 68. Flow control valves 70, 72 and 74 are disposed in the conduits 62, 64 and 66, respectively. Additional hydrogen spargers 76, 78 and 80 are disposed in the downflow legs 25, 27 and 29, respectively. The spargers 76, 78 and 80 are connected to conduits 82, 84 and 86, respectively, which are in turn connected to a hydrogen inlet header 88. Flow control valves 90, 92 and 94 are disposed in the conduits 82, 84 and 86, respectively.

In order to control the level of liquid hydrocarbons in the downflow leg 25 of the first U-shaped conduit 22 and provide the gas accumulation space 44 at the top end thereof, a conventional remote liquid level controller 96, with an acoustic sensor for example, is utilized. The level controller 96 can regulate the speed of the pump 14, or control the rate of hydrogen introduced into the upflow leg 26 by way of the sparger 56, or both, to maintain a constant level of hydrocarbons in the downflow leg 25. The presence of hydrogen bubbles in the liquid hydrocarbons reduces the density of the liquid hydrocarbons. By increasing or decreasing the flow rate of hydrogen introduced into the liquid hydrocarbons in the upflow leg 26 of the U-shaped conduit 22, the flow rate of liquid hydrocarbons flowing through the U-shaped conduit 22 is also increased or decreased. Thus, the liquid level controller 96 can be operably connected to the hydrogen flow rate control valve 70 to maintain a constant level of liquid hydrocarbons in the downflow leg 25. A similar remote liquid level controller 97 operably connected to a flow control valve 98 disposed in the outlet conduit 32 is utilized at the upflow leg 30 of the U-shaped conduit 24 to maintain the liquid level of hydrocarbons therein in the vicinity of the connection of the outlet conduit 32 thereto.

In operation of the reactor 20, a continuous stream of hydrocarbons, with or without catalyst combined therewith, and at a pressure in the range of from about 500 psig to about 3000 psig, flows by way of the inlet connection 18 thereof through the serially connected U-shaped conduits 22, 23 and 24 forming the reactor 20. The level of hydrocarbons in the top end portion of the downflow leg 25 is controlled to provide the gas space 44 by the liquid level controller 96 as previously described. As the stream of hydrocarbons flows downwardly through the leg 25, hydrogen is introduced thereinto by way of the sparger 76 and the stream of hydrocarbons is heated to a temperature in the range of from about 700° F. to about 900° F. by the heater 34 whereby the hydrogenation reaction is commenced. Upon entering the upflow leg 26, additional hydrogen is introduced into the stream of hydrocarbons so that the hydrogenation reaction continues and so that the stream of hydrocarbons is caused to flow through the upflow leg 26 and into the subsequent downflow leg 27 at a flow rate resulting in a substantially constant level being maintained in the preceding downflow leg 25 as previously described. While continuously reacting, the stream of hydrocarbons flows downwardly through the downflow leg 27 wherein additional hydrogen is introduced and dispersed therein by way of the sparger 78, upwardly through the upflow leg 28 wherein additional hydrogen is introduced by the sparger 58, downwardly through the downflow leg 29 wherein additional hydrogen is introduced by the sparger 80, upwardly through the upflow leg 30 and the cooler 36 wherein additional hydrogen is introduced by the sparger 60 and the hydrocarbon stream is cooled and out of the reactor 20 by way of the outlet conduit 32 and valve 98. The operation of the valve 98 and the level of hydrocarbons in the upflow leg 30 are controlled by the level controller 97. The pressure exerted on the stream of hydrocarbons is reduced as it flows through the valve 98.

As previously described, the pressures in the gas accumulation spaces 38, 40, 42 and 44 are equalized, and excess hydrogen as well as vaporized light hydrocarbons produced as a result of the heating the stream of liquid hydrocarbons are withdrawn therefrom by way of the conduits 46, 48, 50 and 52 connected to the header 54. The hydrogen and light hydrocarbon mixture is cooled as it flows through the cooler 55 and it can be conducted to a point of use or further processing by the header 54. If desired, the mixture of hydrogen and hydrocarbons can be combined with additional hydrogen and recycled back into the reactor 20 by way of the hydrogen inlet headers 68 and 88.

Because the hydrocarbon stream flowing through the upflow leg 30 of the U-shaped conduit 24 is cooled by the cooler 36, the control valve 98 and other downstream equipment can be of low temperature design. As mentioned above, the co-current sparging of the hydrogen into the downflow and upflow legs of the serially connected U-shaped conduits causes the hydrogen to be dispersed in small bubbles in the hydrocarbon stream. Because of the successive downward and upward flow paths followed by the hydrocarbon stream containing dispersed hydrogen in the reactor 20, the dispersions of hydrogen and particulate catalyst, if used, are more effectively maintained in the hydrocarbon stream whereby the hydrogenation reaction is efficiently carried out in each of the reaction zones formed by the legs of the U-shaped conduits.

Referring now to FIG. 2, an alternate form of apparatus for carrying out the hydrogenation process of this invention is illustrated and generally designated by the numeral 100. A stream of hydrocarbons to be hydrogenated is conducted to a pump 102 by a conduit 101. The pressure of the stream is elevated to a pressure in the range of from about 500 psig to about 3000 psig. From the pump 102 the pressurized stream of hydrocarbons is conducted to the inlet of a heat exchanger 104 by a conduit 103. Catalyst, if used, is added to the stream of hydrocarbons by means of conventional apparatus (not shown) connected to the conduit 103. While flowing through the heat exchanger 104, the stream of hydrocarbons and catalyst is heated by heat exchange with a heating medium to a temperature in the range of from about 700° F. to about 900° F. The resulting heated hydrocarbon-catalyst stream is conducted by a conduit 106 to the inlet 108 of a reactor, generally designated by the numeral 110.

The reactor 110 is similar to the reactor 10, except that instead of serially connected U-shaped conduits, the reactor 110 includes two or more, preferably three to five, serially connected vessels having vertical draft tubes disposed therein. More specifically, the reactor 110 is comprised of vessels 112, 113 and 114 containing vertical draft tubes 115, 116, and 117, respectively. The draft tubes 115, 116, and 117 have open bottoms and tops, and overflow weir boxes 118, 119 and 120, respectively, are connected to top end portions of the draft tubes below the open tops thereof.

The interior of the weir box 118 of the vessel 112 is connected by a conduit 122 to the inlet 123 of the adjacent vessel 113. The interior of the weir box 119 within the vessel 113 is connected by a conduit 124 to the inlet 125 of the vessel 114. The weir box 120 within the vessel 114 is connected by a conduit 126 to an outlet connection 128.

The internal annular spaces between the walls forming the vessels 112, 113 and 114 and the external surfaces of the draft tubes 115, 116 or 117 therein form vertical reaction zones within the vessels. The internal spaces within the draft tubes 115, 116 and 117 form second vertical reaction zones within the vessels. Thus, the heated hydrocarbon-catalyst stream entering the vessel 112 by the way of the inlet connection 108 thereof flows downwardly through the annular vertical reaction zone between the walls of the vessel 112 and the external surface of the draft tube 115, and then upwardly through the vertical reaction zone formed by the interior of the draft tube 115. The hydrocarbon stream overflows the top of the draft tube 115 and spills into the weir box 118 from where it is conducted to the inlet of the vessel 113 by the conduit 122. In a like manner, the hydrocarbon stream flows downwardly within the vessel 113 and then upwardly within the interior of the draft tube 116 and into the weir box 119. From the weir box 119, the conduit 124 conducts the hydrocarbon stream to the inlet of the vessel 114 wherein it flows downwardly and upwardly and is withdrawn therefrom by way of the conduit 126. From the conduit 126, a conduit 128 conducts the reacted hydrocarbon stream to a heat exchanger 132. While flowing through the heat exchanger 132, the hydrocarbon stream is cooled by heat exchange with a cooling medium. The cooled stream is withdrawn from the heat exchanger 132 by way of a conduit 134 having a flow control valve 136 disposed therein.

A first hydrogen conduit 138 leads a stream of hydrogen from a source thereof to the apparatus 100. A conduit 140 having a flow control valve 142 disposed therein is connected between the conduit 138 and the interior of the vessel 112. That is, the conduit 140 extends through the top wall of the vessel 112 and into the vertical reaction zone formed between the vessel walls and the draft tube 115. A sparger 144 for dispersing hydrogen into the hydrocarbon stream flowing through the reaction zone is attached to the conduit 140. In a like manner, spargers 146 and 148 connected to conduits 150 and 152, respectively, are disposed within vessels 113 and 114. The conduits 150 and 152 are connected to the conduit 138 and have flow control valves 154 and 156, respectively, disposed therein.

In order to disperse additional hydrogen into the hydrocarbon stream flowing through the vessels 112, 113 and 114 and to lift the hydrocarbon stream within the draft tubes 115, 116 and 117 whereby it overflows the open tops thereof, additional spargers 158, 160 and 162 are disposed within the lower internal portions of the draft tubes. The spargers 158, 160 and 162 are connected to conduits 164, 166 and 168 which extend through bottom walls of the vessels 112, 113 and 114, respectively. The conduits 164, 166 and 168 are connected to a second hydrogen inlet conduit 170 and flow control valves 172, 174 and 176 are disposed in conduits 164, 166 and 168, respectively. Thus, additional hydrogen is introduced and dispersed into the hydrocarbon stream flowing upwardly within the draft tubes 115, 116 and 117 causing the hydrocarbon steam to overflow the tops of the draft tubes and spill into the weir boxes 118, 119 and 120. Depending upon the particular quantity of hydrogen introduced into the draft tubes and the corresponding rate of hydrocarbons lifted therewithin, some of the hydrocarbons within each vessel 112, 113 and 114 can be caused to recirculate therein, i.e., spill over the sides of the weir boxes 118, 119 and 120 and recirculate downwardly on the outsides of the draft tubes and upwardly through the insides of the draft tubes.

The levels of hydrocarbons within the annular spaces between the walls and draft tubes of the vessels 112, 113 and 114 are controlled by remote level controllers 186, 188 and 190, respectively, which are operably connected to the hydrogen flow rate control valves 172, 174 and 176, respectively.

Outlet connections are provided at the tops of each of the vessels 112, 113 and 114 for removing excess hydrogen and light hydrocarbon gases therefrom. Conduits 178, 180 and 182 connect the outlets to a header 184 which conducts the hydrogen and hydrocarbon gases to a point of further processing or use after being cooled by a cooler 185 connected in the header 184.

The operation of the apparatus 100 is similar to the apparatus 10 described above except that the apparatus 100 provides for recirculation of hydrocarbons within each of the vessels 112, 113 and 114.

In both the apparatus 10 and apparatus 100, hydrogen is dispersed in a stream of hydrocarbons at elevated pressure and temperature. The hydrocarbon stream containing the hydrogen is passed through a plurality of serially connected hydrogenation reaction zones whereby the hydrocarbon stream is caused to flow along successive downward and upward paths therein. Additional hydrogen is dispersed into the hydrocarbon stream at a plurality of locations along such successive paths. As a result of the sparging of hydrogen into the hydrocarbon stream at a plurality of locations in combination with the successive downward and upward flow of the hydrocarbon stream while being hydrogenated, the dispersions of hydrogen and catalyst, if used, in the stream are promoted and maintained resulting in a highly efficient carrying out of the hydrogenation reaction.

Thus, the present invention is well adapted to carry out the objects and attain the advantages mentioned as well as those inherent, therein. While presently preferred embodiments of the process and apparatus of the invention have been described for purposes of this disclosure, numerous changes will suggest themselves to those skilled in the art, which changes are encompassed within the scope of the appended claims.

What is claimed is:

1. Apparatus for hydrogenating a continuous stream of hydrocarbons at an elevated pressure and temperature comprising:

a hydrogenation reactor having an inlet and an outlet and including means defining two or more serially connected flow passageways connected between said inlet and outlet forming hydrogenation reaction zones wherein a stream of hydrocarbons flowing through said reactor is caused to follow successive downward and upward paths;

hydrogen sparger means disposed in each of said flow passageways of said reactor for dispersing hydrogen into said stream of hydrocarbons flowing therethrough;

first conduit means connected to said hydrogen sparger means for introducing hydrogen to said hydrogen sparger means;

pump means for elevating the pressure of said stream of heavy hydrocarbons and means for heating said stream of heavy hydrocarbons connected to the inlet of said reactor; and means for cooling a reacted stream of hydrocarbons connected to the outlet of said reactor.

2. The apparatus of claim 1 wherein said reactor is comprised of two or more serially connected U-shaped tubular conduits each having downflow and upflow legs forming said hydrogenation reaction zones wherein said stream of hydrocarbons follows successive downward and upward paths, the top end portion of the downflow leg of the first of said U-shaped conduits including said inlet, the top end portion of the upflow leg of the last of said U-shaped conduits including said outlet, and the U-shaped conduits after the first U-shaped conduit each having the top end portion of the downflow leg thereof connected to the top end portion of the upflow leg of the preceding U-shaped conduit.

3. The apparatus of claim 2 wherein said connections between the downflow legs of the U-shaped conduits located after the first U-shaped conduit to the upflow legs of the preceding U-shaped conduits form level controlling liquid hydrocarbon spill-over weirs whereby means defining gas accumulation spaces are provided at the top ends of said upflow legs.

4. The apparatus of claim 3 including second conduit means connected to and between the top ends of said upflow legs and to the top end of the downflow leg of said first U-shaped conduit for equalizing the pressures in and removing hydrogen and light hydrocarbon gases from said top ends.

5. The apparatus of claim 4 including further liquid level control means operably connected to the downflow leg of said first U-shaped conduit and to the upflow leg of the last of said U-shaped conduits to maintain the level of hydrocarbons therein at the top end portions thereof and to provide gas accumulation spaces therein.

6. The apparatus of claim 5 wherein said means for heating said stream of heavy hydrocarbons is a heat exchanger connected to the downflow leg of said first U-shaped conduit.

7. The apparatus of claim 6 wherein said means for cooling said stream of hydrocarbons is a heat exchanger connected to the upflow leg of the last of said U-shaped conduits.

8. The apparatus of claim 1 wherein said reactor is comprised of two or more serially connected vessels, each having a respective draft tubes disposed therein, each of said vessels comprising a wall, the internal annular space defined between the respective wall of each of said vessels and the external surface of the draft tube therein forming a reaction zone wherein said stream of hydrocarbons follows a downward path and the internal space within said draft tube forming another reaction zone wherein said stream of hydrocarbons follows an upward path, said inlet being connected to the first vessel of said series of vessels and communicating with said annular space therewithin, an upper end of the draft tube of each vessel having a means for connecting to the annular space of the next subsequent vessel of said series of vessels, and said outlet being connected to the upper end of the draft tube of the last vessel of said series of vessels.

9. The apparatus of claim 8 wherein said hydrogen sparger means are comprised of a hydrogen sparger disposed in at least the bottom portion of each of said draft tubes.

10. The apparatus of claim 9 wherein each of said vessels includes liquid level control means operably connected thereto for maintaining a liquid hydrocarbon level within said respective annular space therein and provide a gas accumulation space above said liquid hydrocarbon level.

11. The apparatus of claim 10 wherein said means for connecting the upper ends of the draft tubes of said vessels and the annular spaces within the next subsequent vessels each include an overflow weir box whereby portions of said stream of hydrocarbons are recirculated within each of said vessels.

12. The apparatus of claim 11 including respective second conduit means connected to and between the top portions of said vessels for equalizing the pressures in and removing hydrogen and light hydrocarbon gases from said vessels.

* * * * *